United States Patent [19]
Winkler

[11] 3,884,943
[45] May 20, 1975

[54] PREPARATION AND SEPARATION OF 1,5- AND 1,8-DIHYDROXYANTHRAQUINONE

[75] Inventor: Rudolf Winkler, Reinach, Basel-Land, Switzerland

[73] Assignee: Sandoz Ltd., Basel, Switzerland

[22] Filed: May 22, 1972

[21] Appl. No.: 255,253

[30] Foreign Application Priority Data
May 26, 1971 Switzerland.......................... 7686/71

[52] U.S. Cl. ................................................ 260/383
[51] Int. Cl. ............................................ C07c 49/74
[58] Field of Search ..................................... 260/383

[56] References Cited
UNITED STATES PATENTS
1,957,936  5/1934  Buxbaum et al.................... 260/380
2,485,197  10/1949  Grossmann........................ 260/380

FOREIGN PATENTS OR APPLICATIONS
77,818  11/1893  Germany............................ 260/383
1,007,291  10/1965  United Kingdom................ 260/383

OTHER PUBLICATIONS

Beilsteins Handbuch der Organische Chemie, Vierte Auflage, Band VIII, (1925), pp. 458, 459.
Bielsteins Handbuch der Organische Chemie, Vierte Auflage, Band VIII, (1925), pp. 453, 454.
Berichte der Deutschen Chemischen Gesellschaft (1878), Vol. II, p. 1176–1177.
Elsevier's Encyclopedia of Organic Chemistry (1946), Vol. 13, Series III, pg. 534.

Primary Examiner—Lorraine A. Weinberger
Assistant Examiner—Patrick J. Hagan
Attorney, Agent, or Firm—Gerald D. Sharkin; Richard E. Vla; Joseph J. Borovian

[57] ABSTRACT

Disclosed is a process for the production of 1,5- and 1,8-dihydroxyanthranquinone which enables ready separation of the 1,5- and 1,8-isomers, the process comprising saponifying a mixture of 1,5- and 1,8-dialkoxyanthraquinone using a strong mineral acid in acetic acid and with heating.

15 Claims, No Drawings

PREPARATION AND SEPARATION OF 1,5- AND 1,8-DIHYDROXYANTHRAQUINONE

IMPROVEMENTS IN OR RELATING TO ORGANIC COMPOUNDS

The invention relates to a process for the production of 1,5-dihydroxyanthraquinone and 1,8-dihydroxyanthraquinone.

Hitherto, 1,5- and 1,8-dihydroxyanthraquinones have been obtained by processes which involved the separation of 1,5- and 1,8-disubstituted precursors thereof into the two isomeric forms, whereafter the 1,5- and 1,8-dihydroxyanthraquinones are obtained by separate treatment of each isomer. Thus, in a first known process, anthraquinone is disulphonated in the presence of mercury catalysts, from the resulting mixture, 1,5- and 1,8-anthraquinone-disulphonic acids are separated from each other in a sulphuric acid medium and the two isomers separately hydroxylated in autoclaves, using calcium hydroxide, to obtain the corresponding dihydroxy derivatives. In a second known process, anthraquinone is nitrated to dinitroanthraquinone, the $\alpha,\alpha'$-dinitroanthraquinones are isolated, separated into 1,5- and 1,8-isomers in a sulphuric acid medium, the isomers then separately being methoxylated and saponified to the corresponding dihydroxy derivatives.

In the latter of the above described processes large volumes of sulphuric acid are used for the isomer separation and in the former process elevated pressures are required for the hydroxylation of the disulphonic acids.

The process provided by the present invention obviates the need for a pre-separation step of the isomeric forms, the 1,5- and 1,8-dihydroxy derivatives being obtained together in a common reaction medium from which each isomer is isolable in facile manner.

Thus, the invention provides a process for the production of 1,5- and 1,8-dihydroxyanthraquinone which comprises saponifying a mixture of 1,5- and 1,8-dialkoxyanthraquinone, in which the alkoxy groups contain from 1 to 3 carbon atoms, using a strong mineral acid in acetic acid and with heating.

1,5-Dihydroxyanthraquinone precipitates from the heated reaction medium and can be separated therefrom, for example by filtration. 1,8-Dihydroxyanthraquinone remains dissolved in the hot reaction medium but can be precipitated, for example by cooling the medium or by dilution thereof with water.

By the term "strong mineral acid" is meant a mineral acid which dissociates in acetic acid according to the equation:

$$HA + CH_3COOH \rightleftharpoons CH_3COOH_2^{\oplus} + A^{\ominus}.$$

Examples are hydrochloric, hydrobromic, phosphoric and sulphuric acid.

Preferably concentrated acetic acid is employed, glacial acetic acid being most preferred. The mol ratio of acetic acid to dialkoxyanthraquinone preferably lies in the range of from 2:1 to 10:1.

As the stong mineral acid, concentrated sulphuric acid is preferred. It is also preferred that the water content of the reaction medium be kept at a minimum, e.g., by using concentrated acids, if it is desired that the 1,5-dihydroxyanthraquinone be obtained to a high degree of purity, i.e., without being contaminated with coprecipitated 1,8-isomer. Thus, if acetic acid is used which contains water, oleum is preferably used to minimise the water content of the saponification medium. Preferably at least 2 mols of mineral acid are employed per mol of dialkoxyanthraquinone The dialkoxyanthraquinones may be obtained by any of the conventional methods. The preferred dialkoxyanthraquinones are dimethoxyanthraquinones.

The saponification is preferably carried out at a temperature of from 80°C to the reflux temperature of the reaction mixture. The reaction time normally lies in the range of from 5 to 24 hours. If the process is carried out at a temperature below 80°C, longer reaction times are necessary.

In a preferred embodiment of the invention, after completion of saponification, the precipitated 1,5-dihydroxyanthrquinone is separated from the hot mother liquor, which is preferably maintained at a temperature of at least 80°C, and is washed if necessary and dried. 1,8-Dihydroxyanthraquinone is then precipitated out of the mother liquor by cooling to below 80°C, e.g., to a temperature of from 20° to 30°C, or by slow dilution with water or by pouring the liquor into water. It can then be filtered off, washed if necessary and dried. The remaining mixture of mineral acid and acetic acid can then be regenerated, e.g., concentrated by evaporation.

The invention is illustrated by the following Examples in which the parts and percentages are by weight and the temperatures are in degrees centigrade.

EXAMPLE 1

100 Parts of a 1,5-/1,8-dimethoxyanthraquinone mixture, analysed as containing 50 percent 1,5-isomer and 42 percent 1,8-isomer, are suspended in 500 parts of glacial acetic acid. 130 Parts of 93 percent sulphuric acid are added and the suspension boiled for about 9 hours with reflux. It is allowed to cool to 95°, at which temperature crystallized anthrarufin (1,5-dihydroxyanthraquinone) is filtered off. Cooling is then continued to room temperature and at 20° crystallized chrysazine (1,8-dihydroxyanthraquinone) is filtered off. The two products are washed separately with hot water until neutral and then dried. 43 Parts of anthrarufin and 37 parts of chrysazine are obtained.

EXAMPLE 2

100 Parts of a 1,5-/1,8-dimethoxyanthraquinone mixture, analysed as containing 50 percent 1,5-isomer and 42 percent 1,8-isomer, are suspended in 300 parts of glacial acetic acid. 90 Parts of 100 percent sulphuric acid are added and the suspension boiled for about 7 hours with reflux. Crystallized anthrarufin is filtered off at 110°. The mother liquor is then run into 3,000 parts of water. Chrysazine precipitates out and is filtered off. The two separate products are washed with hot water until neutral, and dried. The yield of anthrarufin is 44 parts, that of chrysazine being 37 parts.

What is claimed is:

1. A process for the production and isolation of 1,5-dihydroxyanthraquinone from a mixture of 1,5- and 1,8-dialkoxyanthraquinones in which the alkoxy groups contain 1 to 3 carbon atoms, which comprises the steps of
   a. hydrolyzing said mixture with a strong mineral acid in a molar ratio of at least 2 mols of the mineral acid per mol of said mixture, in acetic acid as solvent and at a temperature of above 80°C., to form a reaction mixture containing 1,5-dihydroxyanthraquinone and 1,8-dihydroxyanthraquinone, b. maintaining the reaction mixture at a temperature of above 80°C. to retain the 1,8-dihydroxyanthraquinone in solution and allow the 1,5-dihydroxyanthraquinone to precipitate, and c. removing the precipitated 1,5-dihydroxyanthraquinone at a temperature of above 80°C. to leave a mother liquor containing the 1,8-dihydroxyanthraquinone.

2. A process according to claim 1, wherein, after separation of the 1,5-dihydroxyanthraquinone, 1,8-dihydroxyanthraquinone is precipitated from the remaining mother liquor and is separated therefrom.

3. A process according to claim 2, wherein the precipitation is effected by cooling the mother liquor to below 80°C.

4. A process according to claim 3, wherein the mother liquor is cooled to a temperature between 20° and 30°C.

5. A process according to claim 2, wherein the precipitation is effected by diluting the mother liquor with water.

6. A process according to claim 2, wherein the water content of the hydrolysis medium is kept at a minimum until after precipitation of the 1,5-dihydroxyanthraquinone.

7. A process according to claim 1, wherein concentrated acetic acid is employed.

8. A process according to claim 7, wherein the acetic acid is glacial acetic acid.

9. A process according to claim 1, wherein the strong mineral acid is hydrochloric acid, hydrobromic acid, phosphoric acid or sulphuric acid.

10. A process according to claim 9, wherein the strong mineral acid is concentrated sulphuric acid or oleum.

11. A process according to claim 1, wherein from 2 to 10 mols of acetic acid are employed per mol of dialkoxyanthraquinone.

12. A process according to claim 1 wherein the strong mineral acid is employed in an amount of up to 3.3 mols per mol of the mixture of 1,5- and 1,8-dialkoxyanthraquinones.

13. A process according to claim 1, wherein the hydrolysis is carried out at a temperature of from 80°C to the reflux temperature of the reaction mixture.

14. A process according to claim 1, wherein the dialkoxyanthraquinone is dimethoxyanthraquinone.

15. A process for the production of 1,5- and 1,8-dihydroxyanthraquinone which comprises hydrolyzing a mixture of 1,5- and 1,8-dimethoxyanthraquinone using concentrated sulphuric acid or oleum in concentrated acetic acid at a temperature of from 80°C to the reflux temperature of the reaction mixture, at least 2 mols of sulphuric acid or oleum and from 2 to 10 mols of acetic acid being employed per mol of dimethoxyanthraquinone, allowing 1,5-dihydroxyanthraquinone to precipitate out whilst the reaction medium is at a temperature of at least 80°C and separating the 1,5-dihydroxyanthraquinone therefrom to leave a mother liquor, subsequently causing precipitation of 1,8-dihydroxyanthraquinone from said mother liquor by cooling said liquor or by dilution thereof with water, and separating the 1,8-dihydroxyanthraquinone therefrom.

* * * * *